(12) United States Patent
Xu et al.

(10) Patent No.: US 9,654,762 B2
(45) Date of Patent: May 16, 2017

(54) APPARATUS AND METHOD FOR STEREOSCOPIC VIDEO WITH MOTION SENSORS

(71) Applicant: Samsung Electronics Co. Ltd., Suwon-si, Gyeonggi-do (KR)

(72) Inventors: Ruifeng Xu, San Jose, CA (US); Ming Jiang, Santa Clara, CA (US); Xu Cao, San Jose, CA (US); Bartley Calder, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 13/632,609

(22) Filed: Oct. 1, 2012

(65) Prior Publication Data

US 2014/0092218 A1    Apr. 3, 2014

(51) Int. Cl.
*H04N 13/02* (2006.01)
*H04N 13/00* (2006.01)

(52) U.S. Cl.
CPC ..... *H04N 13/0221* (2013.01); *H04N 13/0048* (2013.01)

(58) Field of Classification Search
CPC ................. H04N 13/0048; H04N 13/0221
See application file for complete search history.

(56) References Cited

U.S. PATENT DOCUMENTS

| | | | | |
|---|---|---|---|---|
| 6,094,215 A * | 7/2000 | Sundahl | ................. | G03B 35/02 348/155 |
| 7,728,878 B2 * | 6/2010 | Yea | .................... | H04N 13/0242 348/218.1 |
| 2003/0103136 A1 * | 6/2003 | Stanton | .......................... | 348/49 |
| 2008/0056612 A1 * | 3/2008 | Park et al. | .................... | 382/284 |
| 2008/0080852 A1 * | 4/2008 | Chen et al. | .................... | 396/324 |
| 2009/0290645 A1 * | 11/2009 | Mabey | ..................... | 375/240.25 |
| 2010/0053307 A1 * | 3/2010 | Fang | .................... | G06T 7/0075 348/46 |
| 2010/0309286 A1 * | 12/2010 | Chen et al. | ..................... | 348/43 |
| 2010/0309287 A1 * | 12/2010 | Rodriguez | ......... | H04N 13/0059 348/43 |
| 2010/0318914 A1 * | 12/2010 | Zitnick, III | .......... | G11B 27/034 715/719 |
| 2011/0007135 A1 * | 1/2011 | Okada et al. | ................... | 348/46 |
| 2011/0074933 A1 * | 3/2011 | Held | .................. | H04N 13/0033 348/51 |
| 2011/0141235 A1 * | 6/2011 | Tsukagoshi | .......... | H04N 13/007 348/43 |

(Continued)

FOREIGN PATENT DOCUMENTS

CN    102210155 A    10/2011
WO    2012/039306 A1    3/2012

*Primary Examiner* — Thai Tran
*Assistant Examiner* — Christopher T Braniff
(74) *Attorney, Agent, or Firm* — Jefferson IP Law, LLP

(57) ABSTRACT

An apparatus and method for a video capture device for recording 3 Dimensional (3D) stereoscopic video with motion sensors is provided are provided. The apparatus includes includes a camera unit having one lens for capturing video, a video encoder/decoder for encoding the captured video, a motion sensor for capturing motion data of the video capture device corresponding to the captured video, and a controller for controlling the video encoder/decoder and motion sensor to encode the captured video with the captured motion data.

22 Claims, 5 Drawing Sheets

(56) References Cited

U.S. PATENT DOCUMENTS

| | | |
|---|---|---|
| 2011/0149034 A1 | 6/2011 | Tsukagoshi |
| 2011/0304706 A1 | 12/2011 | Border et al. |
| 2012/0026304 A1 | 2/2012 | Kawahara |
| 2013/0162786 A1 | 6/2013 | Kosakai et al. |

* cited by examiner

APPARATUS AND METHOD FOR STEREOSCOPIC VIDEO WITH MOTION SENSORS

BACKGROUND OF THE INVENTION

1. Field of the Invention

The present invention relates to an apparatus and method for stereoscopic video with motion sensors. More particularly, the present invention relates to an apparatus and method for generating stereoscopic video by using motion sensors to produce data used to generate the stereoscopic video.

2. Description of the Related Art

Mobile terminals provide wireless communication between users as well as providing data services and mobile network access to users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, a still image capturing function and/or a video capturing function using a digital camera included in the mobile phone, a multimedia function for providing audio and video content, a scheduling function, and many other functions executable on mobile terminals. With the plurality of features now provided, mobile terminals are used regularly in the daily life of users.

As the use of mobile terminals has grown, use of the image capturing function and/or video capturing function of mobile terminals has also grown. Additionally, the use of stereoscopic imaging for providing 3 Dimensional (3D) imagery and video has increased, and displays for displaying 3D imagery and 3D videos to a user are more widely available. For example, autostereoscopic 3D displays allow for the display of three-dimensional images that can be viewed without the use of special headgear or glasses. These methods produce depth perception to the viewer even though the image is produced by a flat device. Several technologies exist for autostereoscopic 3D displays. Currently, most flat-panel solutions employ lenticular lenses or a parallax barrier. If the viewer positions their head at certain viewing positions, the user will perceive a different image with each eye, resulting in a stereo image that provides an illusion of depth.

FIG. 1 is a diagram illustrating displaying of a stereoscopic image and an original scene of the image according to the related art.

FIG. 2 is a diagram illustrating an original scene of the stereoscopic image of FIG. 1 according to the related art.

Referring to FIGS. 1 and 2, a stereoscopic image provides the illusion of depth via stereopsis, wherein a user views a scene with two eyes using binocular vision so as to view two different images, i.e., the stereo image, of the same scene. The two different images, a left eye view and a right eye view, as viewed through stereoscopic glasses, have a binocular disparity corresponding to a distance between to two different reference points viewing the same scene that is presented in 2 Dimensions (2D), thus, allowing for the illusion of depth and generating of a 3D video. In other words, when each of the two eyes view respective images of the same scene, the binocular disparity between the two images of the same scene results in an illusion of depth due to the different viewing angles of respective images of the same scene, wherein the different viewing angles correspond to the two different reference points viewing the same scene. Accordingly, the difference in viewing angles of the same scene results in stereopsis, thus providing a viewer with an impression of depth when viewing two different viewing angles of the 2D scene. Thus, displays for displaying 3D videos use stereopsis to provide the user a stereoscopic view of a scene. For example, when displaying a scene to the user, two images may be provided to a user, one image being for the user's left eye and another image being for the user's right eye, wherein the two images have respective viewing angles for the one scene. Accordingly, when the user views the same scene via two images having respective viewing angles of the same scene, the user perceives the scene in 3D.

The different images of the same scene may be generated using different cameras at respective locations or one camera having multiple lenses for recording the same scene. However, mobile terminals may include only one camera to generate 2D images and video. Additionally, even though a mobile terminal may include more than one camera, the mobile terminal may have only one digital camera per side. In other words, the mobile terminal may have one front facing camera and one rear facing camera. Accordingly, there is a need for generating stereoscopic video with a mobile terminal using a single lens camera.

SUMMARY OF THE INVENTION

Aspects of the present invention are to address at least the above-mentioned problems and/or disadvantages and to provide at least the advantages described below. Accordingly, an aspect of the present invention is to provide an apparatus and method for generating stereoscopic video by using motion sensors to produce data used to generate the stereoscopic video.

In accordance with another aspect of the present invention, a video capture device for recording 3 Dimensional (3D) stereoscopic video with motion sensors is provided. The video capture device includes a camera unit having one lens for capturing video, a video encoder/decoder for encoding the captured video, a motion sensor for capturing motion data of the video capture device corresponding to the captured video, and a controller for controlling the video encoder/decoder and motion sensor to encode the captured video with the captured motion data.

In accordance with an aspect of the present invention, a method for recording a 3 Dimensional (3D) video using a video capture device is provided. The method includes initializing recording of 3D video, simultaneously capturing video data as video frames and motion data of movement of the video capture device, correlating the motion data and the captured video frames, encoding respective ones of the captured video frames with respective motion data according to the correlation, and storing the encoded 3D video as a recorded 3D video.

In accordance with an aspect of the present invention, a method for reproducing a 3D video using a video display device is provided. The method includes determining whether a 3D video is to be reproduced, determining a correlation distance for displaying of a left eye view and a right eye view of the 3D video, selecting respective frames of the 3D video for the left eye view and the right eye view according to the correlation distance and motion data of respective frames of the 3D video, and simultaneously displaying the respectively selected frames for the left eye view and the right eye view.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for stereoscopic video with motion sensors.

Figure 1:
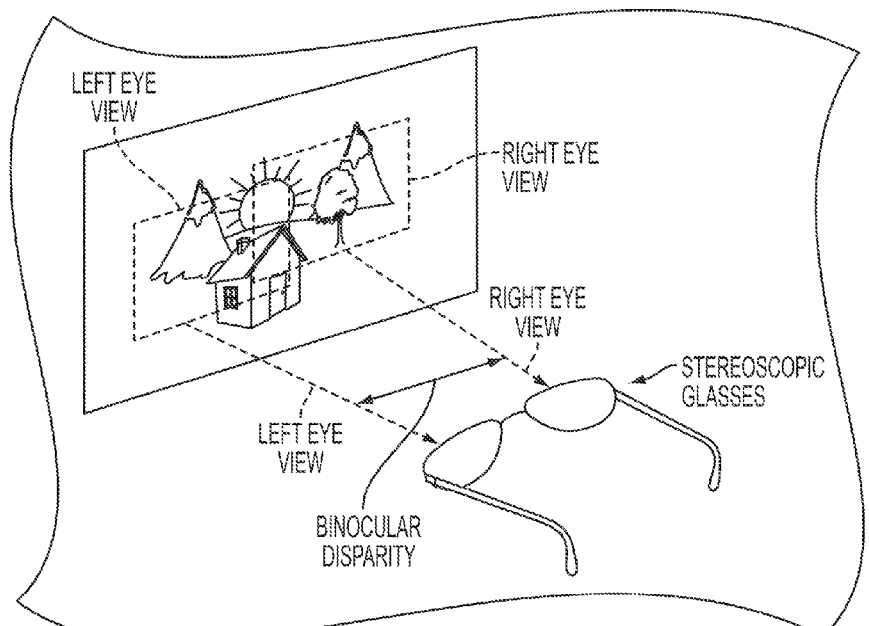
FIG. 1 is a diagram illustrating displaying of a stereoscopic image and an original scene of the image according to the related art.
Figure 2:
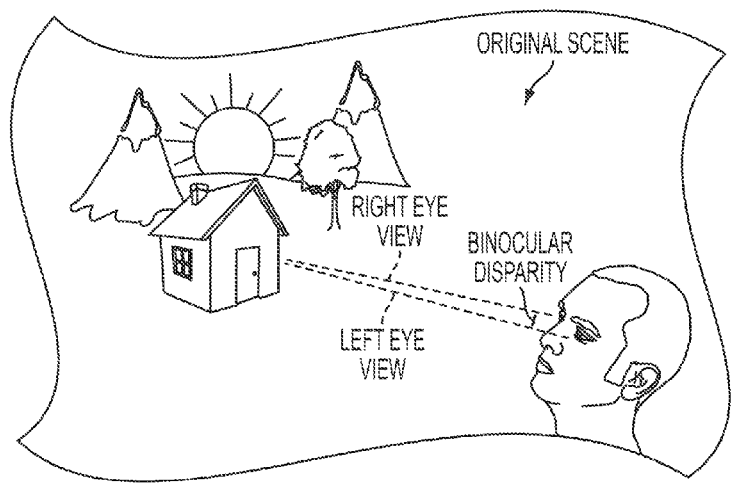
FIG. 2 is a diagram illustrating an original scene of the stereoscopic image of FIG. 1 according to the related art.
Figure 3:
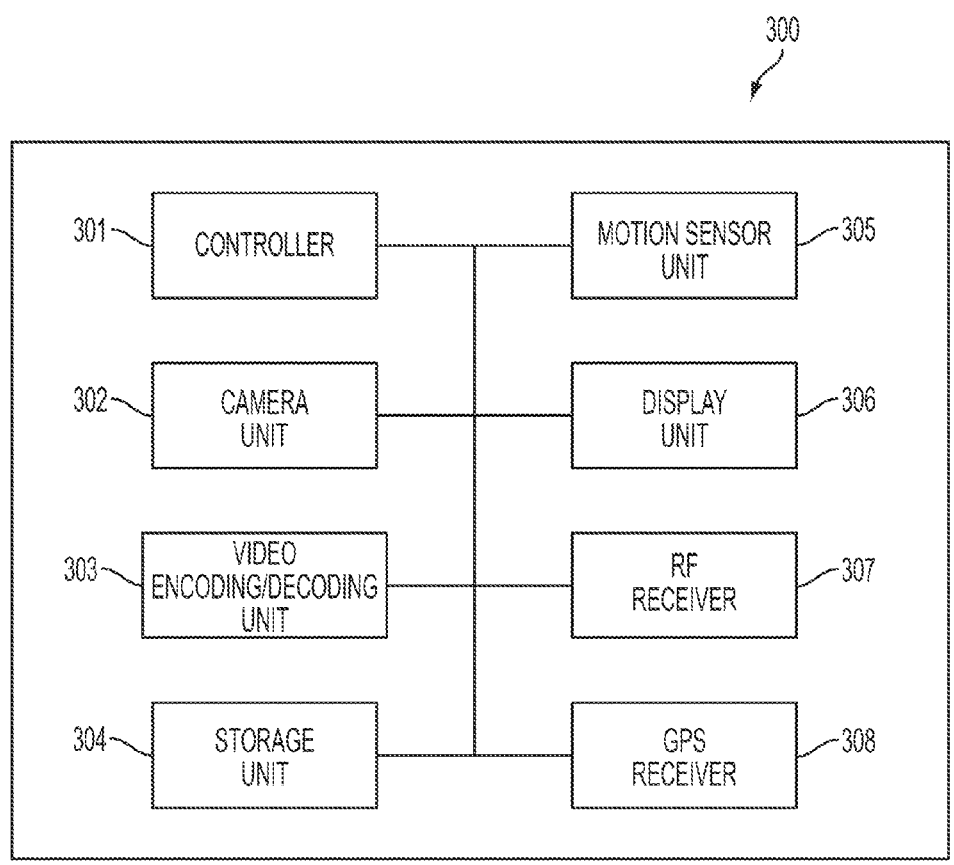
FIG. 3 illustrates a video capture device according to an exemplary embodiment of the present invention.

FIG. 3 illustrates a video capture device according to an exemplary embodiment of the present invention.

Referring to FIG. 3, a video capture device 300 includes a controller 301, a camera unit 302, a video encoding/decoding unit 303, a storage unit 304, a motion sensor unit 305, and a display unit 306. However, the video capture device 300 may be any suitable portable electronic device, including, but not limited to, a mobile telephone, a personal digital assistant, a digital media player, a tablet computer, a personal computer, and any other suitable and/or similar portable electronic device that includes a camera unit for capturing video. Furthermore, in the case that the video capture device 300 is a mobile telephone or any other similar mobile communications device, although not shown, the video capture device 300 may include a Radio Frequency (RF) transceiver 307 for performing wireless communications and a Global Positioning System (GPS) receiver 308 for receiving GPS signals and computing a GPS location. Furthermore, other exemplary embodiments may include additional modules suitable for portable electronic devices, and the functionality of two or more of the modules included in the video capture device 300 may be integrated into a single component.

The controller 301 controls operations of video capture device 300, including signals transmitted from, received by, and exchanged between components included in the video capture device 300 and also controls operations of the components of the video capture device 300. The camera unit 302 is for capturing still images and video, and may be any camera suitable for portable electronic devices. The video encoding/decoding unit 303 encodes still images and video captured by the camera unit 302 for storage on the storage unit 304 and decodes still images and videos stored on the storage unit 304 and/or received via the RF transceiver 307 in order to display the still images and video on the display unit 306. The motion sensor unit 305 detects motion of the video capture device 300 and may be at least one of an accelerometer, a compass, a magnetometer, a gyroscope, and/or any other suitable device for determining motion.

According to an exemplary embodiment of the present invention, the controller 301 controls the video encoding/decoding unit 303 to encode video data received from the camera unit 302. A user of the video capture device 300 may initialize recording of video by activating a video recording function of the video capture device 300. The user may initialize the video recording function using an input unit (not shown) of the video capture device 300, wherein the input unit may be at least one of a touch screen, an input key, and/or any other suitable input device for inputting user commands to the video capture device 300. After initializing the video recording function, the user may initialize the recording of a video in order for the camera unit 302 to capture video data that is provided to the video encoding/decoding unit 303. The video encoding/decoding unit 303 may convert the video data captured into any suitable video codec, such as Motion Picture Experts Group (MPEG) codecs, H.264 codecs, Windows Media Video (WMV) codecs, QuickTime codecs, and/or any other suitable digital video codecs, and may also decode encoded video data for display on the display unit 306.

The video encoding/decoding unit 303 may store encoded video data on the storage unit 304. The stored video data may include at least one of location data and motion data according the motion data sensed by the motion sensor unit 305. For example, when the camera unit 302 is capturing video data that is provided to the video encoding/decoding unit 303, the controller 301 may activate the motion sensor unit 305 in order to simultaneously capture motion data for motion or movement of the video capture device 300. In other words, the controller 301 may control the camera unit 302 to capture video data while controlling the motion sensor unit 305 to simultaneously capture motion data of the video capture device 300. The captured motion data may be provided to video encoding/decoding unit 303 so that respective frames of the encoded video data include motion data corresponding to each respective frame.

Accordingly, the motion sensor unit 305 captures motion data that corresponds to an amount of motion at a time when a video frame was captured with respect to a reference frame. Furthermore, the motion sensor unit 305 may capture data corresponding to each frame of captured video or may capture data corresponding to a period or predetermined amount of time. For example, the motion sensor unit 305 may capture data corresponding to every $N^{th}$ frame, wherein N is an integer value, or may capture data at a periodic rate or time.

Figure 4:
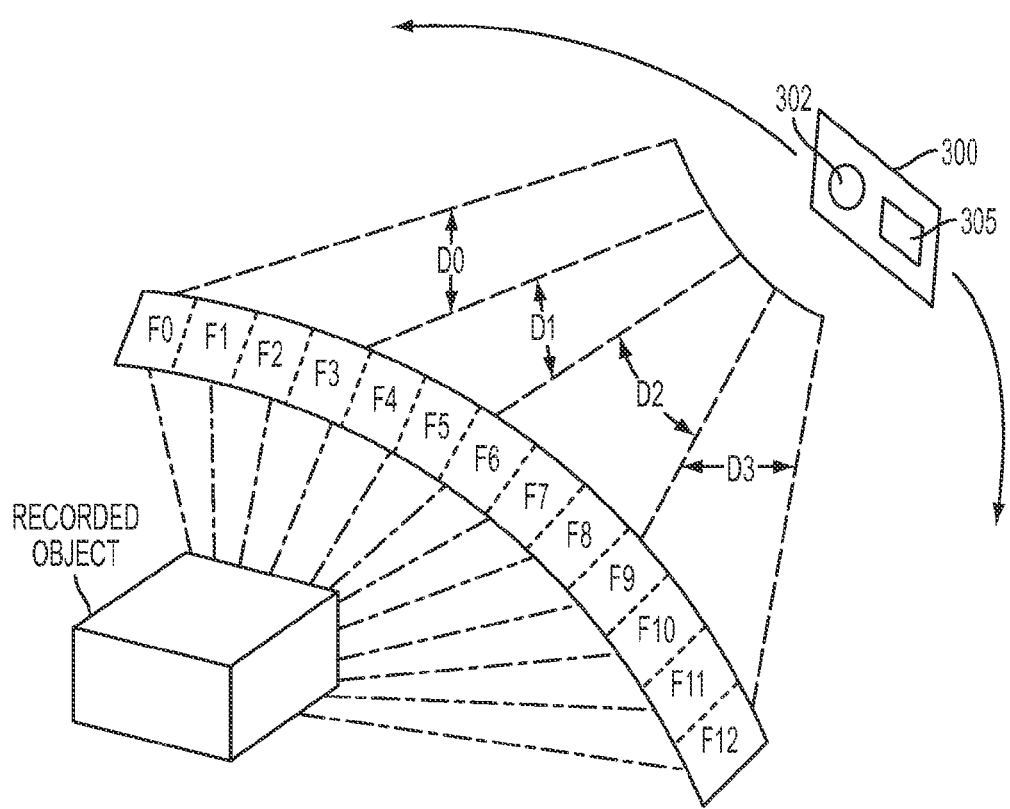
FIG. 4 illustrates recording of a 3 Dimensional (3D) video according to an exemplary embodiment of the present invention.

FIG. 4 illustrates recording of a 3 Dimensional (3D) video according to an exemplary embodiment of the present invention.

Referring to FIG. 4, when a user moves the video capture device 300 while recording a 3D video of a recorded object, the controller controls both the camera unit 302 and the motion sensor unit 305 to record data simultaneously. Accordingly, the motion sensor unit 305 records data corresponding to the motion of the video capture device 300 during the recording of the 3D video. The controller determines an amount of motion, i.e., a distance that the video capture device 300 is moved, between recording of respective frames of the 3D video. For example, if a user generates a video recording of an object while rotating the video capture device 300 around the object, and the video recording includes frames F0 to F12, then the controller may determine amount of motion between two or more recorded frames. In a case where the video capture device 300 is moved between the capturing of frame F0 and the frame F3, then the motion sensor unit 305 determines that a distance of D0, which may also be referred to as motion data D0, has been travelled from the capturing of frame F0 until the capturing of frame F3.

Accordingly, when encoding the captured video, the video encoding/decoding unit 303 receives data corresponding to the distance D0 and stores a first amount of motion between frame F0 and frame F3 as the distance D0 such that the data is stored so as to correspond to the frame F3. The video encoding/decoding unit 303 may encode the data corresponding to the distance D0 with the encoded data of the frame F3 such that the frame F3 is tagged with the distance D0 with respect to the frame F0, which is the reference frame in the present case. In the present case, the motion sensor unit 305 may also determine an amount of distance travelled by the video capture device 300 between frames F3 and F6 as distance D1, between frames F6 and F9 as distance D2, and between frames F9 and F12 as distance D3. Thus, the video encoding/decoding unit 303 may encode video data of the frames F0 to F12 such that the frame F3 is tagged with the distance D0, the frame F6 is tagged with the distance D1, the frame F9 is tagged with the distance D2, and the frame F9 is tagged with the distance D3.

Thus, an amount of movement of the video capture device 300 is recorded for the capturing of the 3D video having the frames F0 to F12 and may be stored on the storage unit 304. The motion data D0, D1, D2 and D3 may be stored in any suitable manner so as to correspond with respective frames F3, F6, F9 and F12. In other words, the recorded frames F3, F6, F9 and F12 may be respectively tagged with the motion data D0, D1, D2 and D3 so that the motion data D0-D3 is encoded with the frame data of the recorded frames F3, F6, F9 and F12. However, the present exemplary embodiment is not limited thereto, and the motion data D0-D3 may be stored separately from the respective frames, or may be stored or recorded in any suitable manner that such that the motion data corresponds to respective recorded frames.

Furthermore, the video encoding/decoding unit 303 may also encode the video data of the frames F0 to F12 so as to include a view angle. The view angle may be an angle between viewing directions of two respective views of the camera corresponding to respective right-eye and left-eye views. Accordingly, the view angle also corresponds to a distance between eyes of a viewer because a viewer's right-eye and left-eye respectively correspond to the right-eye view and the left-eye view, and thus, the view angle is within a predetermined range corresponding to view angles of human eyes. The view angle may be captured at a same time as the motion data, and the view angle may be recorded by the video capture device 300 along with recording of the video data and the motion data. Thus, in addition to encoding the video data of the frames F0 to F12, the video encoding/decoding unit 303 may also include a view angle corresponding to an angle between viewing directions of any two of the frames F0 to F12. In other words, the video encoding/decoding unit 303 encodes the view angle with the encoding of the frames F0 to F12, wherein the view angle is an angular distance between viewing directions of a predetermined pair, or any other suitable pair, of frames F0 to F12.

In order to display a 3D video recorded according to the exemplary embodiment described above, the controller 301 controls the display unit 305 to display frames according to a left eye view and a right eye view for the user viewing the 3D video. In the present exemplary embodiment, the display unit 305 is used to display the 3D video. However, the 3D video may be displayed on the display unit 305 or any other suitable display unit that may be internal or external to the video capture device 300 and that is suitable for displaying a left eye view and a right eye view of the 3D video. The 3D video is displayed such that a difference between the left eye view and the right eye view correspond to a distance between the user's left eye and right eye. More particularly, the distance between the user's left eye and right eye is used to determine a frame of the left eye view and a frame of the right eye view, from among the frames F0-F12, that are simultaneously displayed to the user, according to the motion data D0-D3.

In other words, in reproducing the 3D video, the correlation distance is determined according to a distance between a user's eyes so as to select frames that are recorded at a certain distance from each other and that are to be displayed simultaneously to a user in order to generate an illusion of depth. The correlation distance may be determined according to a manual input and/or adjustment by a user viewing the 3D video, may be automatically determined according to a sensed distance between a display device displaying the 3D video and the user viewing the 3D video, and may be a predetermined value. However, the present invention is not limited thereto, and the correlation distance may be determined according to any suitable method and/or means. Furthermore, the correlation distance is used in conjunction with the stored view angle of a pair of the frames F0-F12, such that the view angle corresponds to the view angle of a selected pair of frames F0-F12 that are to be displayed as the respective left-eye view and right-eye view.

More particularly, in the case where the distance between a user's eyes correlates to the distance D0, then the frame F0 may be displayed as the left eye view at the same time that the frame F3, which was recorded at a distance D0 from the recording of the frame F0, is displayed as the right eye view. Thus, the display unit 305 provides an illusion of depth by simultaneously displaying two frames recorded at respective locations that are a distance D0 from each other, wherein the distance D0 corresponds to a distance between a user's eyes. Furthermore, the view angle of the user's eyes with respect to the displayed 3D video may be used to select a corresponding view angle of a pair of the frames F0 to F12, such that the view angle of the pair of the frames F0 to F12 corresponds to the view angle of the user's eyes. In other words, the display unit 305 displays a video recorded with a monocular lens as a video recorded with a binocular lens by simultaneously displaying frames recorded at different locations using the monocular lens, or in other words, a single lens camera of the video capture device 300.

Figure 5:
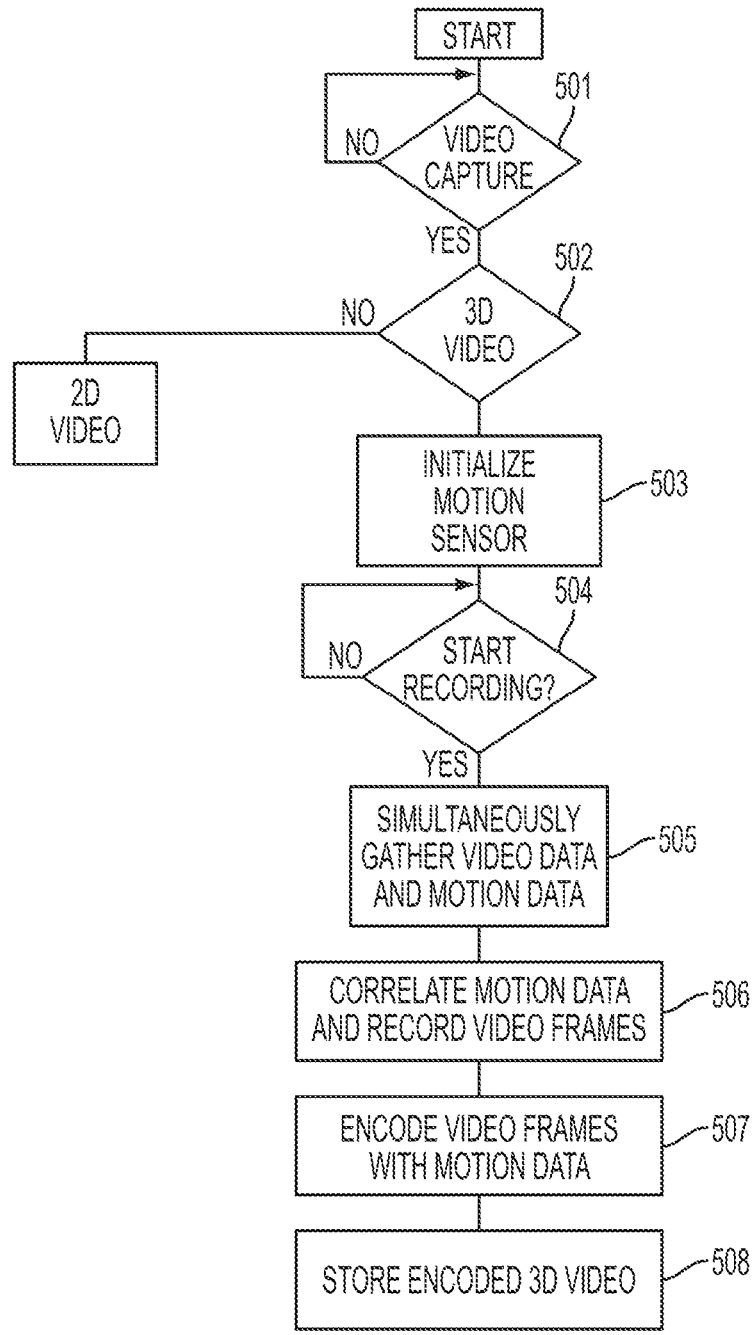
FIG. 5 illustrates a method of recording a 3D video according to exemplary embodiments of the present invention.

FIG. 5 illustrates a method of recording a 3D video according to exemplary embodiments of the present invention.

Referring to FIG. 5, the video capture device 300 determines whether a user initializes a video capture feature in step 501. After initializing the video capture feature, the video capture device 300, at step 502, determines whether the user selects recording of a 3D video. If the user does not select the recording of the 3D video, the video capture device 300 proceeds to capturing a 2D video in step 500. If the user selects the recording of the 3D video in step 502, then the video capture device 300 proceeds to step 503 in order to initialize the motion sensor unit 305. Next, in step 504, the video capture device 300 determines whether the user starts recording the 3D video. Upon the user starting the recording of the 3D video, the video capture device 300, in step 505, simultaneously gathers video data and motion data, wherein the motion data may include the view angle.

After gathering the video data and the corresponding motion data, the video capture device 300 correlates respective motion data with respective recorded video frames in step 506. Next, in step 507, the video capture device 300 encodes respective video frames with respective motion data according to the correlation done in step 506. After the 3D video is encoded in step 507, the video capture device 300 stores the encoded 3D video in step 508.

Figure 6:
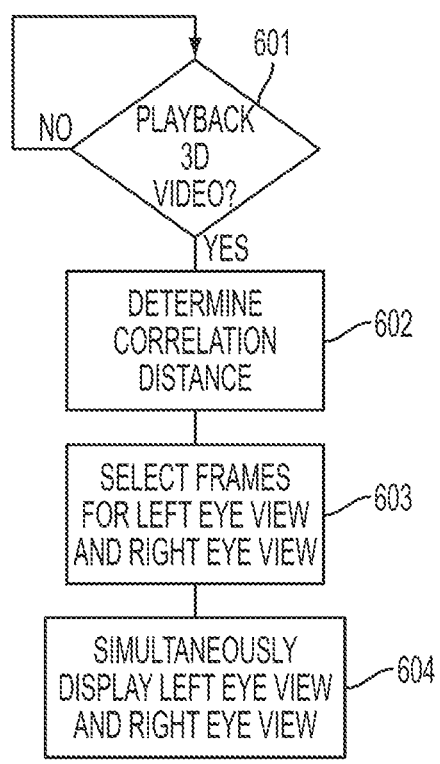
FIG. 6 illustrates a method of reproducing a 3D video according to exemplary embodiments of the present invention.

FIG. 6 illustrates a method of reproducing a 3D video according to exemplary embodiments of the present invention.

Referring to FIG. 6, a video display device, which may be any device suitable for displaying a stereoscopic 3D video, determines if a user has initialized playback, i.e., reproducing, of a 3D video in step 601. Next, the video display device determines the correlation distance, in step 602, according to at least one of a predetermined distance, a sensed input and a user input. Next, in step 603, the video display device selects respective frames of the 3D video for a left eye view and a right eye view according to the correlation distance and motion data of the respective frames. In further detail, the video display device may select the respective frames of the 3D video according to a view angle of any pair of frames from among the frames F0-F12, wherein the view angle of pairs of frame from among the frames F0-F12 is included in the encoded 3D video data and/or the motion data of the encoded 3D video. The respective frames of the 3D video may be selected upon decoding of the 3D video or may be selected before decoding of the encoded 3D video according to the motion data tagged with respective frames of the 3D video. However, the present invention is not limited thereto, and the respective frames may be respectively selected for the left eye view and the right eye view according to any suitable method using the motion data and the correlation distance. Next, in step 604, the video display device simultaneously displays the respectively selected frames for the left eye view and the right eye view of the user. The user may be wearing stereoscopic glasses in order to correctly view the left eye view and the right eye view displayed by the video display device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A video capture device for recording 3 Dimensional (3D) stereoscopic video with motion sensors, the video capture device comprising:
   a camera;
   a video encoder/decoder;
   a motion sensor;
   a memory; and
   at least one processor configured to:
      control the camera to capture a video using only one lens of the camera, the captured video including a plurality of frames,
      receive, from the motion sensor, motion data including information corresponding to movement of the video capture device that occurred while the camera was capturing the video,
      determine a distance in which the video capture device is moved between a first frame and a second frame of the video captured by the camera based on the motion data, and
      provide, to the video encoder/decoder, the determined distance in which the video capture device is moved between a first frame and a second frame of the captured video,
   wherein the video encoder/decoder tags the second frame of the captured video with the determined distance in which the video capture device is moved between the first frame and the second frame, and
   wherein a 3D stereoscopic video is reproduced by selecting a subgroup of the plurality of frames of the captured video based on information included in the tag of the second frame.

2. The video capture device of claim 1, wherein the motion sensor is at least one of an accelerometer, a compass, a magnetometer, and a gyroscope.

3. The video capture device of claim 1, wherein the at least one processor is further configured to:
   simultaneously control the camera to capture the video and the motion sensor to capture the motion data.

4. The video capture device of claim 1, wherein the at least one processor is further configured to:
   correlate frames of the captured video with information corresponding to movement of the video capture device that occurred while the plurality of frames is captured.

5. The video capture device of claim 4, wherein the at least one processor is further configured to:

correlate each frame of the captured video with information corresponding to the movement of the video capture device that occurred while each of the plurality of frames is captured.

6. A method for recording a 3 Dimensional (3D) video using a video capture device, the method comprising:
receiving an indication to initialize a video capture feature of the video capture device;
simultaneously capturing video data as a plurality of video frames and motion data of movement of the video capture device, the video data being captured by only one lens of a camera of the video capture device and the motion data being detected by a motion sensor of the video capture device;
determining a distance in which the video capture device is moved between a first video frame and a second video frame of the plurality of captured video frames based on the motion data detected by the motion sensor;
encoding the plurality of captured video frames and information associated with the determined distance the video capture device is moved between the first video frame and the second video frame in the second video frame of the plurality of captured video frames using a video encoder/decoder of the video capture device; and
storing the encoded plurality of captured video frames and information associated with the determined distance as a recorded 3D video in a memory of the video capture device,
wherein the encoding of the information associated with the determined distance in which the video capture device is moved between the first video frame and the second video frame comprises tagging the second frame with the determined distance in which the video capture device is moved between the first video frame and the second video frame, and
wherein a 3D stereoscopic video is reproduced by selecting a subgroup of the plurality of captured video frames based on information included in the tag of the second frame.

7. The method of claim 6, wherein the method further comprises:
determining whether the indication to initialize the video capture feature is associated with capturing a 2D video or a 3D video; and
initializing the motion sensor if the indication to initialize the video capture feature is associated with capturing the 3D video,
wherein the motion sensor is not initialized if the indication to initialize the video capture feature is associated with capturing the 2D video.

8. The method of claim 6, wherein the simultaneous capturing of the video data and the motion data comprises:
capturing the motion data of the movement of the video capture device when the camera of the video capture device is capturing the video data as the video frames.

9. The method of claim 6, wherein the distance the video capture device is moved is a distance between a position of the video capture device at a time of recording a reference video frame and a position of the video capture device at a time of recording the second video frame of the 3D video.

10. The method of claim 6, further comprising:
determining a view angle between the first video frame and the second video frame of the plurality of captured video frames; and further encoding information associated with the view angle between the first video frame and the second video frame in the second video frame of the captured video frames.

11. The method of claim 10, wherein the view angle is an angular distance between a viewing direction of the video capture device at a time of recording the first video frame and a viewing direction of the video capture device at a time of recording the second video frame.

12. The method of claim 6, further comprising:
determining a distance in which the video capture device is moved between each of the plurality of captured video frames of the recorded 3D video.

13. The method of claim 6, wherein the determining of the distance in which the video capture device is moved occurs according to a predetermine time period.

14. The method of claim 6, further comprising:
determining a distance in which the video capture device is moved at every $N^{th}$ frame of the 3D video,
wherein N is an integer value.

15. A method for reproducing a 3 Dimensional (3D) video using a video display device, the method comprising:
determining whether a 3D video is to be reproduced based on an indication to initialize a video playback feature received at the video display device;
detecting, by the video display device, a distance between a viewing entity and the video display device after receiving the indication to initialize the video playback feature;
determining, at the video display device, a correlation distance for displaying of a left eye view and a right eye view of the 3D video based on the detected distance between the viewing entity and the video display device;
selecting, by the video display device, a first frame of the 3D video for the left eye view and a second frame different from the first frame of the 3D video for the right eye view based on the correlation distance and motion data of respective frames of the 3D video; and
simultaneously displaying the first frame and the second frame,
wherein the 3D video includes video data that was captured using only one lens of a camera,
wherein the first frame and the second frame are selected from among a plurality of 3D video frames, and
wherein the plurality of 3D video frames includes three or more 3D video frames.

16. The method of claim 15, wherein the simultaneous displaying of the first frame and the second frame corresponds to a first lens and a second lens of a pair of stereoscopic glasses, respectively.

17. The method of claim 15, wherein the selecting of the first frame and the second frame of the 3D video performed after decoding the 3D video.

18. The method of claim 15, wherein the selecting of the first frame and the second frame of the 3D video is performed before decoding the 3D video according to the motion data tagged with respective frames of the 3D video.

19. The method of claim 15, further comprising:
receiving an input to adjust the correlation distance between the left eye view and the right eye view of the 3D video;
determining an adjusted correlation distance between the left eye view and the right eye view of the 3D video based on the input;

selecting a third frame of the 3D video for the left eye view and a fourth frame of the 3D video for the right eye view based on the determined adjusted correlation distance; and simultaneously displaying the third frame and the fourth frame, wherein simultaneously displaying the third frame and the fourth frame results in a stereographic image that provides an illusion of depth.

20. The method of claim 15, wherein the determining of the correlation distance comprises selecting the correlation distance from among predetermined correlation distances.

21. The method of claim 15, further comprising:

determining a view angle corresponding to the determined correlation distance, wherein the first frame of the 3D video for the left eye view and the second frame of the 3D video for the right eye view are selected based on the correlation distance, the motion data of respective frames of the 3D video, and the view angle.

22. The method of claim 21, wherein the determining of the view angle comprises:

determining an angular distance between a viewing direction of the video capture device at a time of recording the first frame and a viewing direction of the video capture device at a time of recording the second frame.

* * * * *